US010960477B2

(12) United States Patent
Takemoto et al.

(10) Patent No.: US 10,960,477 B2
(45) Date of Patent: Mar. 30, 2021

(54) MONITORING DEVICE AND METHOD OF MONITORING

(71) Applicant: FANUC CORPORATION, Yamanashi (JP)

(72) Inventors: Masanobu Takemoto, Yamanashi-ken (JP); Kaoru Hiraga, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 130 days.

(21) Appl. No.: 16/266,568

(22) Filed: Feb. 4, 2019

(65) Prior Publication Data

US 2019/0240755 A1    Aug. 8, 2019

(30) Foreign Application Priority Data

Feb. 8, 2018    (JP) .............................. JP2018-020708

(51) Int. Cl.
*B23H 1/02*    (2006.01)
*B23H 7/20*    (2006.01)
(Continued)

(52) U.S. Cl.
CPC .............. *B23H 1/024* (2013.01); *B23H 7/04* (2013.01); *B23H 7/16* (2013.01); *B23H 7/20* (2013.01);
(Continued)

(58) Field of Classification Search
None
See application file for complete search history.

(56) References Cited

U.S. PATENT DOCUMENTS 5,081,332 A * 1/1992 Sakuragawa ............ B23H 1/10
219/69.13
5,408,224 A * 4/1995 Yamazaki ................ G07C 3/00
340/309.7
(Continued)

FOREIGN PATENT DOCUMENTS

CN        103281392 A    9/2013
CN        103576606 A    2/2014
(Continued)

OTHER PUBLICATIONS

English Abstract and Machine Translation for Japanese Publication No. JPH11-058479A, published Mar. 2, 1999, 16 pgs.
(Continued)

*Primary Examiner* — Geoffrey S Evans
(74) *Attorney, Agent, or Firm* — Fredrikson & Byron, P.A.

(57) ABSTRACT

A monitoring device for monitoring an operation condition of a machine tool includes: an information acquiring section that acquires event information generated by operation of the machine tool and state information of the machine tool; a judging section that when, after generation of the event information, there has occurred a predetermined change of state of the machine tool corresponding to content indicated by the event information, judges whether or not the content indicated by the event information has been resolved, based on the event information and the state information; and a notifying section that, in the case where when there has occurred the predetermined change of state of the machine tool corresponding to the content indicated by the event information, it has been judged that the content indicated by the event information has not been resolved, re-notifies of the generated event information.

11 Claims, 5 Drawing Sheets

(51) Int. Cl.
  *B23H 7/04* (2006.01)
  *B23H 7/16* (2006.01)
  *G05B 19/406* (2006.01)
(52) U.S. Cl.
  CPC .. *G05B 19/406* (2013.01); *G05B 2219/49326* (2013.01); *G05B 2219/50185* (2013.01)

(56) References Cited

U.S. PATENT DOCUMENTS

| | | | |
|---|---|---|---|
| 5,548,535 | A | 8/1996 | Zvonar |
| 2004/0111237 | A1* | 6/2004 | Vlok ................... G05B 19/4065 702/183 |
| 2008/0025734 | A1* | 1/2008 | Kehoe .................... G03G 15/55 399/8 |
| 2014/0034265 | A1 | 2/2014 | Suzuki et al. |
| 2014/0156057 | A1* | 6/2014 | Tong .................. G05B 19/4065 700/175 |
| 2016/0096231 | A1* | 4/2016 | Nishikawa ........... B01D 35/143 210/90 |
| 2017/0193654 | A1 | 7/2017 | Hashimoto et al. |
| 2017/0269566 | A1 | 9/2017 | Ogawa |
| 2017/0269811 | A1 | 9/2017 | Tsujimura et al. |
| 2018/0284737 | A1* | 10/2018 | Cella ........................ H04W 4/38 |

FOREIGN PATENT DOCUMENTS

| | | | |
|---|---|---|---|
| CN | 107407914 | A | 11/2017 |
| CN | 107530829 | A | 1/2018 |
| JP | S54-012085 | A | 1/1979 |
| JP | H10-320031 | A | 12/1998 |
| JP | H11058479 | A | 3/1999 |
| JP | 2003-022112 | A | 1/2003 |
| JP | 2005107788 | A | 4/2005 |
| JP | 2005107788 | A * | 4/2005 |
| JP | 2012-203782 | A | 10/2012 |
| JP | 2013-204930 | A | 10/2013 |
| JP | 201430862 | A | 2/2014 |
| JP | 2016074057 | A | 5/2016 |
| JP | 2017121679 | A | 7/2017 |
| JP | 2017-167866 | A | 9/2017 |
| TW | 201113657 | A | 4/2011 |
| TW | 201413626 | A | 4/2014 |

OTHER PUBLICATIONS

English Abstract and Machine Translation for Taiwanese Publication No. TW201113657A, published Apr. 16, 2011, 15 pgs.
English Abstract and Machine Translation for Taiwanese Publication No. TW201413626A, published Apr. 1, 2014, 11 pgs.
English Abstract and Machine Translation for Japanese Publication No. JP2016-074057A, published May 12, 2016, 12 pgs.
English Abstract and Machine Translation for Japanese Publication No. H10-320031 A, published Dec. 4, 1998, 6 pgs.
English Abstract and Machine Translation for Japanese Publication No. 2013-204930 A, published Oct. 7, 2013, 21 pgs.
English Abstract and Machine Translation for Japanese Publication No. 2003-022112 A, published Jan. 24, 2003 6 pgs.
English Abstract and Machine Translation for Japanese Publication No. 2017-167866 A, published Sep. 21, 2017, 12 pgs.
English Abstract and Machine Translation for Japanese Publication No. S54-012085 A, published Jan. 29, 1979, 5 pgs.
English Abstract and Machine Translation for Japanese Publication No. 2012-203782 A, published Oct. 22, 2012, 10 pgs.
Extended European Search Report for European Patent Application No. 19155855.0, dated Jun. 12, 2019, 7 pgs.
English Abstract and Machine Translation for Japanese Publication No. 2005-107788 A, published Apr. 21, 2002, 7 pgs.
English Abstract for Japanese Publication No. 2014-030862 A, published Feb. 20, 2014, 2 pgs.
English Abstract for Japanese Publication No. 2017-121679 A, published Jul. 13, 2017, 2 pgs.
English Machine Translation of Decision to Grant a Patent mailed by Japan Patent Office (JPO) for Application No. JP2018-020708, Feb. 25, 2020, 2 pages.
Untranslated Decision to Grant a Patent mailed by Japan Patent Office (JPO) for Application No. JP2018-020708, Feb. 25, 2020, 3 pages.
English Machine Translation of Notification of Reasons for Refusal mailed by Japan Patent Office (JPO) for Application No. JP2018-020708, Jan. 7, 2020, 3 pages.
Untranslated Notification of Reasons for Refusal mailed by Japan Patent Office (JPO) for Application No. JP2018-020708, Jan. 7, 2020, 3 pages.
English Abstract and Machine Translation for Chinese Publication No. CN103281392A, published Sep. 4, 2013, 16 pgs.
English Abstract and Machine Translation for Chinese Publication No. CN103576606A, published Feb. 12, 2014, 20 pgs.
English Abstract and Machine Translation for Chinese Publication No. CN107407914A, published Nov. 28, 2017, 12 pgs.
English Abstract and Machine Translation for Chinese Publication No. CN107530829A, published Jan. 2, 2018, 9 pgs.

\* cited by examiner

| Content of Event Information | State Change of Wire Electric Discharge Machine |
|---|---|
| Replacement of Filter | Power Source from OFF to ON |
| ... | |
| ⋮ | |
| Periodic Inspection | Automatic Operation Starts |
| ... | |
| ⋮ | |
| | |

FIG. 4

MONITORING DEVICE AND METHOD OF MONITORING

CROSS-REFERENCE TO RELATED APPLICATION

This application is based upon and claims the benefit of priority from Japanese Patent Application No. 2018-020708 filed on Feb. 8, 2018, the contents of which are incorporated herein by reference.

BACKGROUND OF THE INVENTION

Field of the Invention

The present invention relates to a monitoring device and a method of monitoring for monitoring an operation condition of a machine tool.

Description of the Related Art

Japanese Patent Application Laid-Open Publication No. 2005-107788 discloses that when an alarm is generated in a machine tool, a supervisor of that machine tool is notified of the generated alarm.

SUMMARY OF THE INVENTION

An event such as a periodic inspection is performed by an operator operating that machine tool, and, even if the event is not immediately executed, the machine tool can be operated normally for a certain amount of time. Therefore, sometimes, the supervisor of the machine tool, while intending to notify the operator of the event later, ends up forgetting that a notification of that event has come. Moreover, sometimes, even if the supervisor notifies the operator immediately of the event, the operator, while intending to perform that event later, ends up forgetting to execute the event.

Therefore, it is conceivable that in order to avoid continuation of a state of the event not being executed, re-notification of the event is performed every fixed time (for example, 24 hours) until the event is executed. However, if an interval of notifying of the event (the fixed time) is shortened, that notification feels troublesome for the supervisor. Moreover, if the interval of notifying of the event (the fixed time) is lengthened, there is a risk of continuation of a state of the machine tool being left with the event unexecuted.

Accordingly, the present invention has an object of providing a monitoring device and a method of monitoring that reduce a troublesome feeling of re-notification of event information generated in a machine tool and that prevent the machine tool being left without content indicated in the event information being resolved.

A first aspect of the present invention is a monitoring device for monitoring an operation condition of a machine tool, including: an information acquiring section that acquires event information generated by operation of the machine tool and state information of the machine tool; a judging section that when, after generation of the event information, there has occurred a predetermined change of state of the machine tool corresponding to content indicated by the event information, judges whether or not the content indicated by the event information has been resolved, based on the event information and the state information; and a notifying section that, in the case where when there has occurred the predetermined change of state of the machine tool corresponding to the content indicated by the event information, it has been judged that the content indicated by the event information has not been resolved, re-notifies of the generated event information.

A second aspect of the present invention is a method of monitoring by which a monitoring device monitors an operation condition of a machine tool, including: an information acquiring step that acquires event information generated by operation of the machine tool and state information of the machine tool; a judging step that when, after generation of the event information, there has occurred a predetermined change of state of the machine tool corresponding to content indicated by the event information, judges whether or not the content indicated by the event information has been resolved, based on the event information and the state information; and a notifying step that, in the case where when there has occurred the predetermined change of state of the machine tool corresponding to the content indicated by the event information, it has been judged that the content indicated by the event information has not been resolved, re-notifies of the generated event information.

Due to the present invention, a supervisor can be re-notified, at an appropriate timing, of event information generated in a machine tool. Therefore, a troublesome feeling of re-notification of the event information felt by the supervisor can be reduced, and it can be prevented that content shown in the event information is left unresolved.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a monitoring device and a method of monitoring according to the present invention will be presented and described in detail below with reference to the accompanying drawings.

Embodiment

Figure 1:
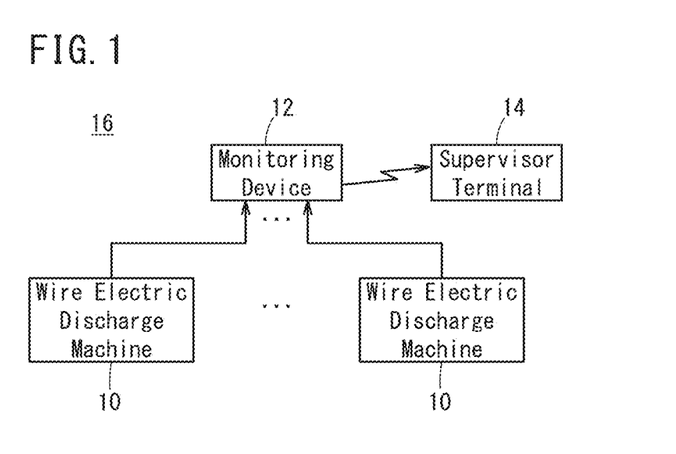
FIG. 1 is an overall configuration diagram of a monitoring system.

FIG. 1 is an overall configuration diagram of a monitoring system 16 that includes a plurality of wire electric discharge machines 10, a monitoring device 12, and a supervisor terminal 14. The plurality of wire electric discharge machines 10 are configured capable of communicating in a wired or wireless manner with the monitoring device 12. The monitoring device 12 is configured capable of mutually communicating in a wireless manner with the supervisor terminal 14, via an internet, for example.

The wire electric discharge machine 10 is a machine tool that processes a processing object by generating an electric discharge between a wire electrode and the processing object. The plurality of wire electric discharge machines 10 transmit to the monitoring device 12 event information generated by operation.

For example, when a replacement time of a filter for removing a processing waste (sludge) included in a processing liquid comes, event information urging replacement of the filter is generated. When a time of a periodic inspection comes, event information urging performing the periodic inspection is generated. When a replacement time of a wire bobbin supplying the wire electrode comes, event information urging replacement of the wire bobbin is generated. When a certain amount or more of used wire electrode accumulates in a collection box, event information urging removal of the used wire electrode that has accumulated in the collection box is generated. Thus, when there is a need for attention to be called such as when a maintenance time comes or when expendables are to be replaced, the event information is generated. This event information is supplemented with identifying information that identifies the wire electric discharge machine 10.

In addition, the wire electric discharge machine 10 transmits to the monitoring device 12 state information indicating a state of the wire electric discharge machine 10. States of the wire electric discharge machine 10 include the likes of whether a power source is ON, whether automatic operation has been started, whether the filter has been replaced, whether the periodic inspection has been executed, and whether the collection box has been removed, for example.

The wire electric discharge machine 10 collects the state of the wire electric discharge machine 10 based on a plurality of sensors provided to the wire electric discharge machine 10 that detect various kinds of states and based on operation, by an operator, of an input section (illustration of which is omitted) provided to the wire electric discharge machine 10, and successively transmits the state information to the monitoring device 12. This state information indicating the state of the wire electric discharge machine 10 is supplemented with identifying information for identifying the wire electric discharge machine 10.

The monitoring device 12 monitors an operation condition of the wire electric discharge machine 10. The monitoring device 12 will be described in detail later.

The supervisor terminal 14 is a terminal computer maintained by a supervisor supervising the plurality of wire electric discharge machines 10. The supervisor terminal 14 will be described in detail later.

Figure 2:
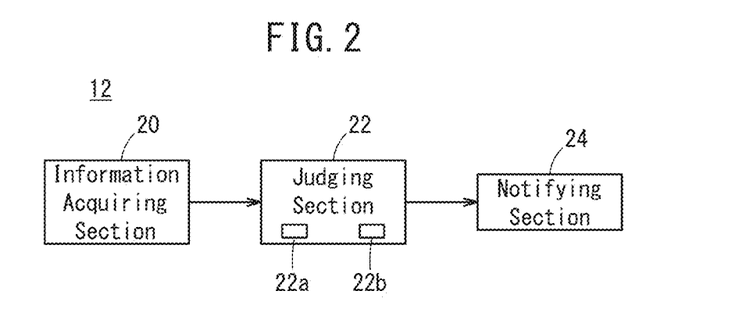
FIG. 2 is a functional block diagram showing an electrical configuration of a monitoring device shown in FIG. 1.

FIG. 2 is a functional block diagram showing an electrical configuration of the monitoring device 12. The monitoring device 12 is a computer that includes: a CPU; and a storage section configured by the likes of a volatile memory and a nonvolatile memory.

The monitoring device 12 includes an information acquiring section 20, a judging section 22, and a notifying section 24. The information acquiring section 20 receives and thereby acquires the event information and the state information of the wire electric discharge machine 10 that have been sent from the wire electric discharge machine 10. The information acquiring section 20 outputs the acquired event information and state information to the judging section 22.

The judging section 22, when, after generation of the event information, there has occurred a predetermined change of state of the wire electric discharge machine 10 corresponding to content indicated by this event information, judges whether or not the content indicated by the generated event information has been resolved, based on the event information and the state information. The judging section 22 performs this judgment for each wire electric discharge machine 10, based on the identifying information supplementing the event information and the state information.

The predetermined change of state of the wire electric discharge machine 10 corresponding to the generated event information refers to one that, when this change of state of the wire electric discharge machine 10 has occurred, the content indicated by the generated event information is expected to have been resolved. The judging section 22, upon judging that the content indicated by the generated event information has not been resolved when there has occurred the change of state of the wire electric discharge machine 10, outputs the acquired event information to the notifying section 24. Note that the judging section 22 outputs the acquired event information to the notifying section 24 at a time of generation of the event information.

The notifying section 24, upon being sent the event information from the judging section 22, notifies the supervisor of the sent event information. As a result, the supervisor can be notified of the event information at the time of generation of the event information, and a re-notification of the event information can be performed at an appropriate timing after generation of the event information too. It is therefore possible to reduce a troublesome feeling felt by the supervisor due to re-notification of the same event information being frequently performed, and to prevent the content indicated by the event information from being left unresolved for a long time.

The notifying section 24 transmits the event information to the supervisor terminal 14 held by the supervisor, and thereby notifies the supervisor of the event information. In the present embodiment, the notifying section 24 is assumed to notify the supervisor of the event information by transmitting the event information to the supervisor terminal 14 by email. The supervisor who has received the notification instructs the operator of the wire electric discharge machine 10 where that event information has been generated to resolve the content indicated by the event information.

Next, the judging section 22 will be described in detail. The judging section 22 includes: a storage section 22a that stores the acquired event information; and a table 22b that stores, in a corresponding manner, the content indicated by the event information and the predetermined state change of the wire electric discharge machine 10 corresponding to this content of the event information.

The judging section 22, upon acquiring the event information, stores the acquired event information in the storage section 22a and outputs the acquired event information to the notifying section 24.

Figure 3:
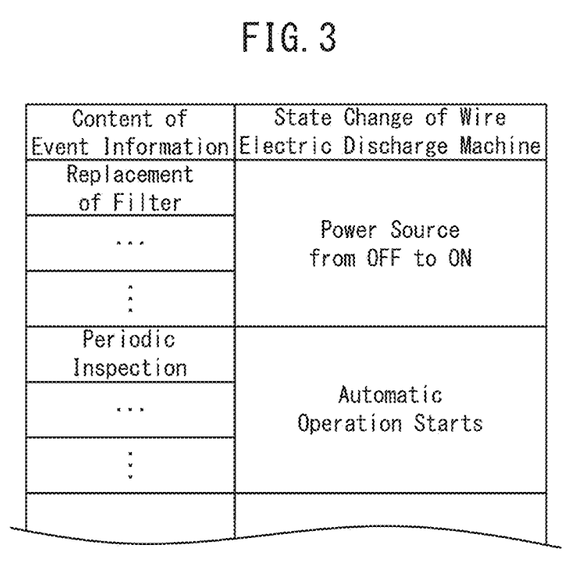
FIG. 3 is a view showing a table that stores, in a corresponding manner, content indicated by event information and a predetermined state change of a wire electric discharge machine corresponding to this content of the event information.

The judging section 22 acquires the predetermined state change of the wire electric discharge machine 10 corresponding to the event information stored in the storage section 22a, based on the event information and the table 22b shown in FIG. 3. Then, the judging section 22 uses the state information to judge whether or not there has occurred in the wire electric discharge machine 10 the state change acquired from the table 22b. Moreover, the judging section 22 judges whether or not the content indicated by the event information stored in the storage section 22a has been resolved, based on the event information and the state information. Then, in the case where when there has occurred the change of state of the wire electric discharge machine 10 corresponding to the event information, if the content indicated by the generated event information has not been resolved, the judging section 22 outputs the acquired event information again to the notifying section 24. Note that the judging section 22, upon judging that the content indicated by the event information stored in the storage section 22a has been resolved, deletes the event information stored in the storage section 22a.

As shown in FIG. 3, changes of state of the wire electric discharge machine 10 include the likes of "the power source of the wire electric discharge machine 10 has been switched from OFF to ON" and "automatic operation has been started". Moreover, one or a plurality of items of event information are stored correspondingly to each of the state changes of the wire electric discharge machine 10 such as "the power source of the wire electric discharge machine 10 has been switched from OFF to ON" and "automatic operation has been started".

The event information that has been corresponded to "the power source of the wire electric discharge machine 10 has been switched from OFF to ON" is event information whose content indicated by the event information is expected to have been resolved when the power source of the wire electric discharge machine 10 has been switched from OFF to ON.

For example, replacement of the filter is performed when the power source of the wire electric discharge machine 10 is OFF. As a result, when the power source of the wire electric discharge machine 10 has been switched from OFF to ON, a state of filter replacement having been performed should already have been attained. Therefore, "replacement of the filter" (the content of the event information) and "the power source of the wire electric discharge machine 10 has been switched from OFF to ON" (the state change of the wire electric discharge machine 10) are stored corresponded to one another in the table 22b.

In the case where, despite the event information whose content is "replacement of the filter" having been generated and the power source of the wire electric discharge machine 10 having subsequently been switched from OFF to ON, replacement of the filter has not been performed, it means that the supervisor has forgotten an instruction of filter replacement to the operator of the wire electric discharge machine 10 or the operator of the wire electric discharge machine 10 has forgotten replacement of the filter. In this case, when, after generation of the event information whose content is "filter replacement", the power source of the wire electric discharge machine 10 has been switched from OFF to ON, the judging section 22 judges that the content "filter replacement" indicated by the generated event information has not been resolved, and outputs that event information again to the notifying section 24. Therefore, the notifying section 24 will, as a result, re-notify of the event information whose content is "filter replacement". As a result, the supervisor who has received the re-notification will instruct the operator of the wire electric discharge machine 10 where the event information has been generated to resolve the content of the event information (to replace the filter).

Moreover, the event information that has been corresponded to "automatic operation has been started" is event information whose content indicated by the event information is expected to have been resolved when the wire electric discharge machine 10 starts automatic operation.

For example, the periodic inspection is performed before automatic operation is started. As a result, when automatic operation has been started, a state of the periodic inspection having been performed should already have been attained. Therefore, "periodic inspection" (the content of the event information) and "automatic operation has been started" (the state change of the wire electric discharge machine 10) are stored corresponded to one another in the table 22b.

In the case where, despite the event information whose content is "periodic inspection" having been generated and automatic operation of the wire electric discharge machine 10 having subsequently been started, the periodic inspection has not been performed (the content indicated by the event information has not been resolved), it means that the supervisor has forgotten an instruction of periodic inspection to the operator of the wire electric discharge machine 10 or the operator of the wire electric discharge machine 10 has forgotten the periodic inspection. In this case, when, after generation of the event information whose content is "periodic inspection", automatic operation has been started, the judging section 22 judges that the content "periodic inspection" indicated by the generated event information has not been resolved, and outputs that event information again to the notifying section 24. Therefore, the notifying section 24 will, as a result, re-notify of the event information whose content is "periodic inspection". As a result, the supervisor who has received the re-notification will instruct the operator of the wire electric discharge machine 10 where the event information has been generated to resolve the content of the event information (to perform the periodic inspection).

Figure 4:
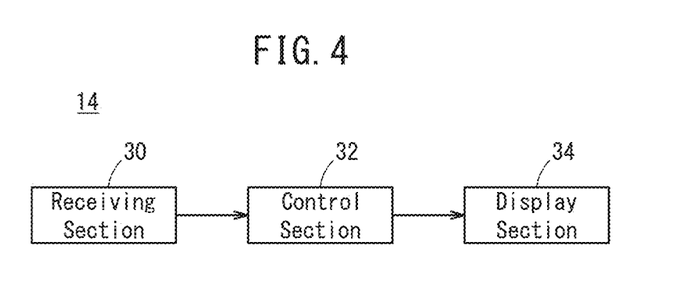
FIG. 4 is a functional block diagram showing an electrical configuration of a supervisor terminal.

FIG. 4 is a functional block diagram showing an electrical configuration of the supervisor terminal 14. The supervisor terminal 14 is a computer that includes: a CPU; and a storage section configured by the likes of a volatile memory and a nonvolatile memory.

The supervisor terminal 14 includes a receiving section 30, a control section 32, and a display section 34. The receiving section 30 receives the event information that has been sent from the notifying section 24. The receiving section 30 outputs the received event information to the control section 32. The control section 32 displays the received event information in the display section 34. By the control section 32 displaying the received event information in the display section 34 in this way, the supervisor can be notified of the event information. A notification of event information first sent from the notifying section 24 due to generation of the event information will be an initial notification, and event information notified again after the notification of the event information will be a re-notification. The control section 32 also displays in the display section 34 the wire electric discharge machine 10 where the event information has been generated, based on the identifying information attached to that event information.

Figure 5:
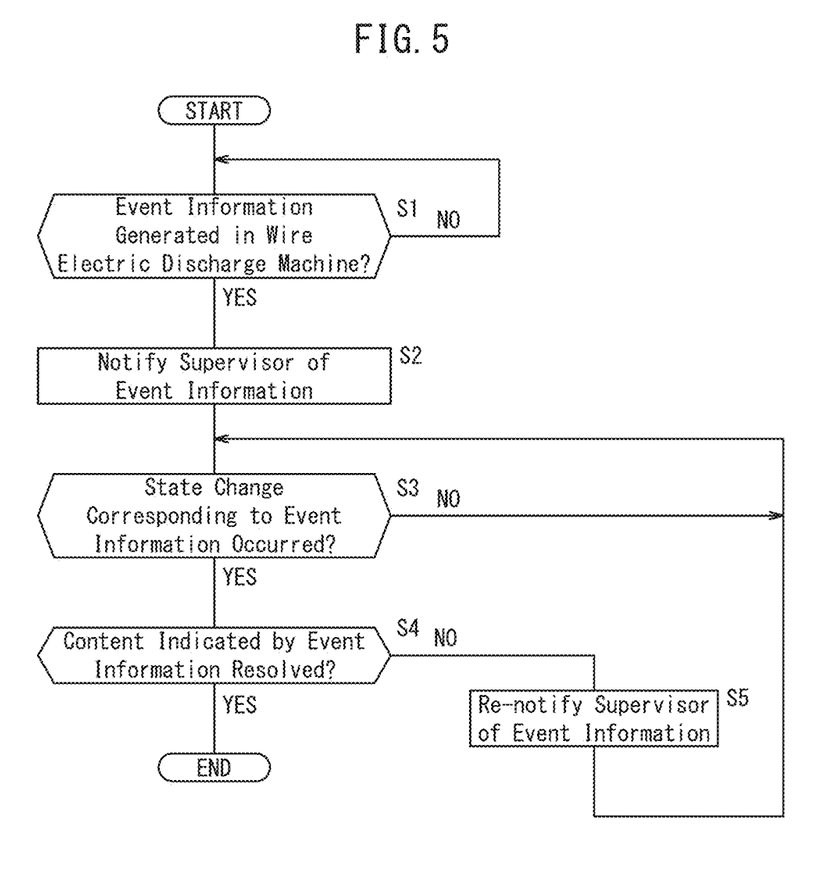
FIG. 5 is a flowchart showing operation of the monitoring device shown in FIG. 2.

Next, operation of the monitoring device 12 will be described following the flowchart shown in FIG. 5. The monitoring device 12 is assumed to be successively acquiring from the wire electric discharge machine 10 state information indicating the state of the wire electric discharge machine 10.

In step S1, the judging section 22 judges whether or not event information has been generated in the wire electric discharge machine 10. The judging section 22, upon acquiring, via the information acquiring section 20, event information that has been generated in the wire electric discharge machine 10, judges that event information has been generated in the wire electric discharge machine 10. Note that the judging section 22, upon judging in step S1 that event information has been generated, outputs the generated (acquired) event information to the notifying section 24.

If it is judged in step S1 that event information has been generated, operation proceeds to step S2, and if it is judged in step S1 that event information has not been generated, then operation stays in step S1 until event information is judged to have been generated.

Upon proceeding to step S2, the notifying section 24 transmits the event information to the supervisor terminal 14, and thereby notifies the supervisor of the event information. When the event information is sent to the supervisor terminal 14, the event information is displayed in the display section 34.

Next, in step S3, the judging section 22 judges whether or not there occurs a predetermined state change of the wire electric discharge machine 10 corresponding to the content of the event information generated in step S1.

If the judging section 22 judges in step S3 that there does not occur a predetermined state change of the wire electric discharge machine 10 corresponding to the content of the event information generated in step S1, then operation stays in step S3 until the state change is judged to occur. On the other hand, if the judging section 22 judges in step S3 that there occurs a predetermined state change of the wire electric discharge machine 10 corresponding to the content of the event information generated in step S1, then operation proceeds to step S4.

Upon proceeding to step S4, the judging section 22 judges whether or not the content indicated by the event information has been resolved. If it is judged in step S4 that the content indicated by the event information has not been resolved, then operation proceeds to step S5, and if it is judged in step S4 that the content indicated by the event information has been resolved, then the present operation finishes. Note that the judging section 22, upon judging in step S4 that the content indicated by the event information has not been resolved, outputs the event information again to the notifying section 24.

Upon proceeding to step S5, the notifying section 24 re-notifies the supervisor of the event information, whereupon operation returns to step S3. When the event information is sent to the supervisor terminal 14, the event information is displayed in the display section 34.

Thus, in the case that when, after generation of event information, there has occurred a predetermined change of state of the wire electric discharge machine 10 corresponding to the content indicated by the event information, the content indicated by the event information has not been resolved, the supervisor is re-notified of the event information. Therefore, the supervisor can be re-notified, at an appropriate timing, of the event information generated in the wire electric discharge machine 10. As a result, it is possible to reduce the troublesome feeling of re-notification of the event information felt by the supervisor and to prevent a state of the content indicated in the event information from being left unresolved for a long time.

Note that although in the above-described embodiment, description was made exemplifying the wire electric discharge machine 10 as the machine tool, the machine tool may be a machine tool other than the wire electric discharge machine 10. For example, the machine tool may be a machine tool that processes a processing object using an electrode other than a wire electrode (a so-called electric discharge machine). Moreover, the machine tool may be a machine tool that processes a processing object using a tool such as a drill, an end mill, or a milling cutter (a so-called robodrill or robonano).

Technical Ideas Obtained from Embodiment

Technical ideas understandable from the above-described embodiment will be described below.
<First Technical Idea>

A monitoring device (12) for monitoring an operation condition of a machine tool (10) includes: an information acquiring section (20) that acquires event information generated by operation of the machine tool (10) and state information of the machine tool (10); a judging section (22) that when, after generation of the event information, there has occurred a predetermined change of state of the machine tool (10) corresponding to content indicated by the event information, judges whether or not the content indicated by the event information has been resolved, based on the event information and the state information; and a notifying section (24) that, in the case where when there has occurred the predetermined change of state of the machine tool (10) corresponding to the content indicated by the event information, it has been judged that the content indicated by the event information has not been resolved, re-notifies of the generated event information.

As a result, a supervisor can be re-notified, at an appropriate timing, of the event information generated in the machine tool (10). Therefore, it is possible to reduce the troublesome feeling of re-notification of the event information felt by the supervisor and to prevent the content indicated in the event information from being left unresolved.

The predetermined change of state of the machine tool (10) may be that a power source of the machine tool (10) has been switched from OFF to ON.

The machine tool (10) may be a wire electric discharge machine (10), and the content of the event information may be content urging replacement of a filter of the wire electric discharge machine (10).

The predetermined change of state of the machine tool (10) may be that automatic operation to automatically perform a processing has been started.

The content of the event information may be content urging a periodic inspection of the machine tool (10).

The notifying section (24) may re-notify by email.
<Second Technical Idea>

A method of monitoring by which a monitoring device (12) monitors an operation condition of a machine tool (10) includes: an information acquiring step that acquires event information generated by operation of the machine tool (10) and state information of the machine tool (10); a judging step that when, after generation of the event information, there has occurred a predetermined change of state of the machine tool (10) corresponding to content indicated by the event information, judges whether or not the content indicated by the event information has been resolved, based on the event information and the state information; and a notifying step that, in the case where when there has occurred the predetermined change of state of the machine tool (10) corresponding to the content indicated by the event information, it has been judged that the content indicated by the event information has not been resolved, re-notifies of the generated event information.

As a result, a supervisor can be re-notified, at an appropriate timing, of the event information generated in the machine tool (10). Therefore, it is possible to reduce the troublesome feeling of re-notification of the event information felt by the supervisor and to prevent the content indicated in the event information from being left unresolved.

The predetermined change of state of the machine tool (10) may be that a power source of the machine tool (10) has been switched from OFF to ON.

The machine tool (10) may be a wire electric discharge machine (10), and the content of the event information may be content urging replacement of a filter of the wire electric discharge machine (10).

The predetermined change of state of the machine tool (10) may be that automatic operation to automatically perform a processing has been started.

The content of the event information may be content urging a periodic inspection of the machine tool (10).

The notifying step may re-notify by email.

The present invention is not limited to the above-described embodiment, and various modifications can be made

What is claimed is:

1. A monitoring device for monitoring an operation condition of a machine tool operatively connected to the monitoring device, the monitoring device comprising a processor configured to:

communicate with the machine tool to acquire event information generated by operation of the machine tool and state information of the machine tool from the machine tool;

after generation of the event information, and in response to the occurrence of there has occurred a predetermined change of state of the machine tool corresponding to content indicated by the event information, judge whether or not the content indicated by the event information has been resolved, based on the event information and the state information; and in response to judging that the content indicated by the event information has not been resolved after the occurrence of the predetermined change of state of the machine tool corresponding to the content indicated by the event information re-notify of the generated event information, wherein the predetermined change of state of the machine tool is that a power source of the machine tool has been switched from OFF to ON.

2. The monitoring device according to claim 1, wherein the machine tool is a wire electric discharge machine, and the content of the event information is content urging replacement of a filter of the wire electric discharge machine.

3. The monitoring device according to claim 1, wherein the notifying section re-notifies by email.

4. The monitoring device of claim 1, wherein the processor is configured to judge whether or not the content indicated by the event information has been resolved based on the event information, the state information, and a lookup table.

5. A monitoring device for monitoring an operation condition of a machine tool operatively connected to the monitoring device, the monitoring device comprising a processor configured to:

communicate with the machine tool to acquire event information generated by operation of the machine tool and state information of the machine tool from the machine tool;

after generation of the event information, and in response to an occurrence of a predetermined change of state of the machine tool corresponding to content indicated by the event information, judge whether or not the content indicated by the event information has been resolved, based on the event information and the state information; and in response to judging that the content indicated by the event information has not been resolved after the occurrence of the predetermined change of state of the machine tool corresponding to the content indicated by the event information re-notify of the generated event information, wherein the predetermined change of state of the machine tool is that automatic operation to automatically perform a processing has been started.

6. The monitoring device according to claim 5, wherein the content of the event information is content urging a periodic inspection of the machine tool.

7. A method of monitoring by which a monitoring device monitors an operation condition of a machine tool operatively connected to the monitoring device, the method including:

communicating with the machine tool to acquire event information generated by operation of the machine tool and state information of the machine tool from the machine tool;

after generation of the event information, and in response to an occurrence of a predetermined change of state of the machine tool corresponding to content indicated by the event information, judging whether or not the content indicated by the event information has been resolved, based on the event information and the state information; and in response to judging that the content indicated by the event information has not been resolved after the occurrence of the predetermined change of state of the machine tool corresponding to the content indicated by the event information, re-notifying of the generated event information, wherein the predetermined change of state of the machine tool is that a power source of the machine tool has been switched from OFF to ON.

8. The method of monitoring according to claim 7, wherein the machine tool is a wire electric discharge machine, and the content of the event information is content urging replacement of a filter of the wire electric discharge machine.

9. The method of monitoring according to claim 7, wherein the notifying step re-notifies by email.

10. A method of monitoring by which a monitoring device monitors an operation condition of a machine tool operatively connected to the monitoring device, the method including:

communicating with the machine tool to acquire event information generated by operation of the machine tool and state information of the machine tool from the machine tool;

after generation of the event information, and in response to an occurrence of a predetermined change of state of the machine tool corresponding to content indicated by the event information, judging whether or not the content indicated by the event information has been resolved, based on the event information and the state information; and in response to judging that the content indicated by the event information has not been resolved after the occurrence of the predetermined change of state of the machine tool corresponding to the content indicated by the event information, re-notifying of the generated event information, wherein the predetermined change of state of the machine tool is that automatic operation to automatically perform a processing has been started.

11. The method of monitoring according to claim 10, wherein
the content of the event information is content urging a periodic inspection of the machine tool.

\* \* \* \* \*